C. D. LANNING.
MEANS FOR CONTROLLING DIRECT CURRENTS.
APPLICATION FILED MAY 29, 1912. RENEWED SEPT. 29, 1914.

1,131,251.

Patented Mar. 9, 1915.
2 SHEETS—SHEET 1.

Witnesses:
E. Lillian McFadden
J. R. Hanlon.

Inventor:
Charles D. Lanning

UNITED STATES PATENT OFFICE.

CHARLES D. LANNING, OF BOSTON, MASSACHUSETTS.

MEANS FOR CONTROLLING DIRECT CURRENTS.

1,131,251.      Specification of Letters Patent.      Patented Mar. 9, 1915.

Application filed May 29, 1912, Serial No. 700,457. Renewed September 29, 1914. Serial No. 864,189.

*To all whom it may concern:*

Be it known that I, CHARLES D. LANNING, a citizen of the United States of America, residing at Boston, in the county of Suffolk and Commonwealth of Massachusetts, have invented certain new and useful Improvements Relating to Means for Controlling Direct Currents, of which the following is a description.

In some instances where direct currents are impressed upon a conductor and given a varying value or undulatory form it is desired to accentuate the undulatory form of the current for the purpose of energizing directly or indirectly appropriately designed instrumentalities. For instance in the art of telephony as commonly practised an undulatory current is set up by the voice-actuated transmitter and utilized generally inductionally to generate alternating line currents; and similarly in telephonic repeating or current-reinforcing devices a direct current is appropriately varied in value and given an undulatory form by receiving devices operatively related to the line system and this new undulatory direct current is utilized generally inductionally to generate new alternating currents for relaying or reinforcement of the original line current.

My present invention has particular reference to means whereby the undulations of the direct current may be accentuated by appropriate devices and combinations as distinguished from apparatus in which instrumentalities having means acting singly on a direct current are employed as above described to generate alternating currents and reimpress these on line currents or otherwise employ such new alternating currents for relaying or reinforcing purposes.

To accomplish this my invention broadly provides means whereby in combination with the conductor carrying the direct current and primary means for giving said current a varying value or undulatory form auxiliary means are connected to be energized by said conductor and to control devices which are made re-active on said conductor so that they coöperate with said primary means to accentuate the undulatory form of said current.

I have illustrated my invention in the annexed drawings, in which—

Figure 1:
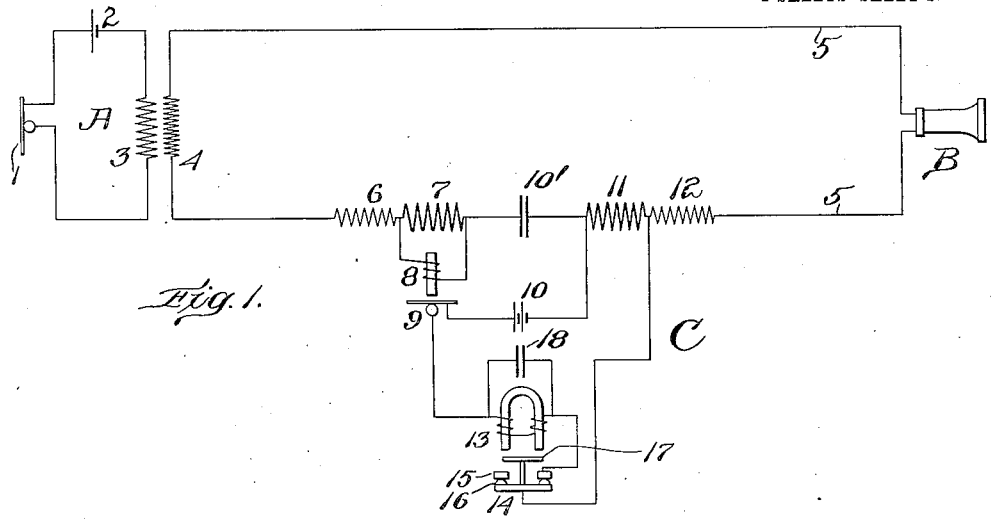
Figure 2:
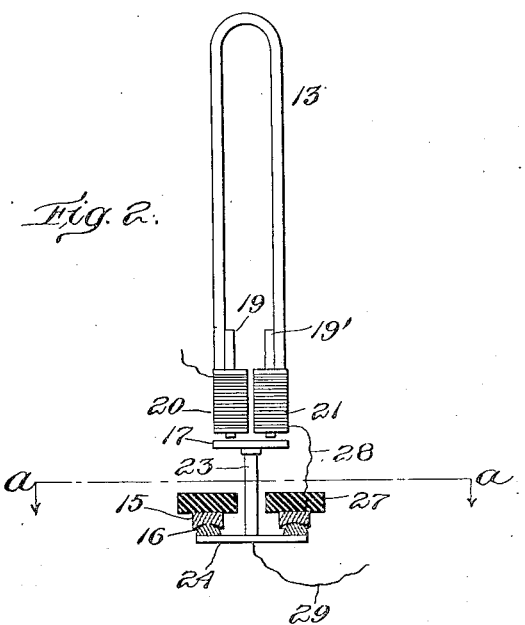
Figure 2A:
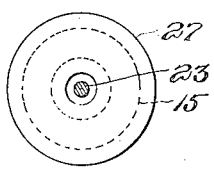
Figure 3:
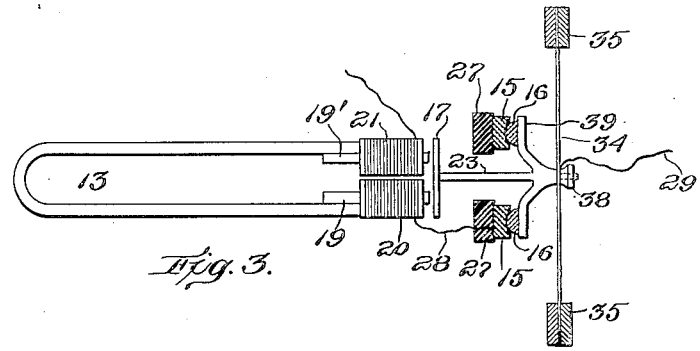
Figure 4:
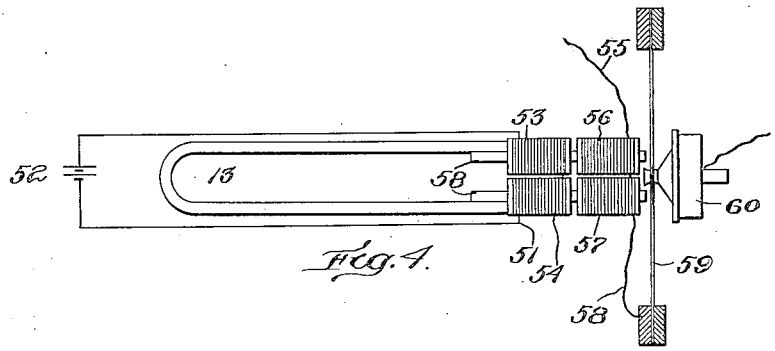
Figure 5:
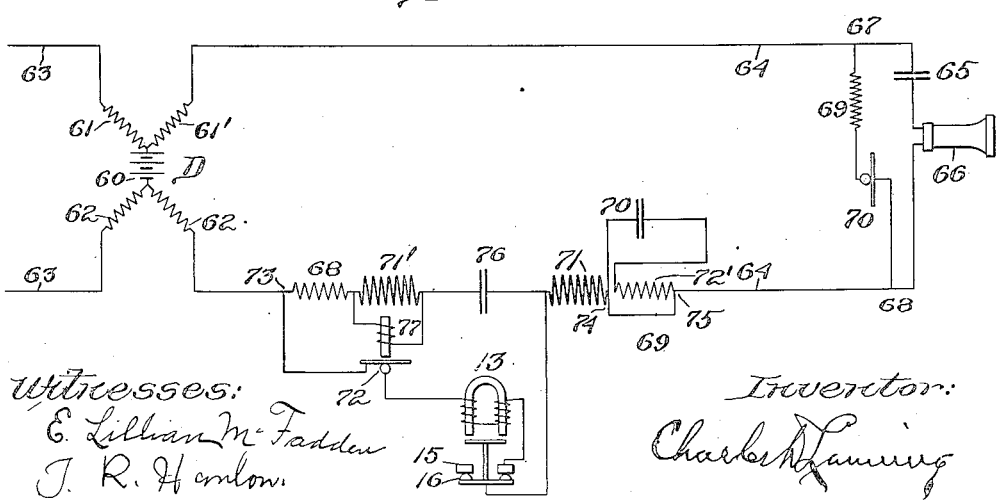

Figure 1 shows it in combination with a repeater or reinforcing arrangement constituting part of one-way telephone circuit; Fig. 2 is a detail of Fig. 1; Fig. 2ª is a detail of Fig. 2, being a plan thereof looking down on line *a, a;* Fig. 3 is another form of a detail similar to Fig. 2; Fig. 4 is another form of associated magnet and microphone; and Fig. 5 is a combination showing the application of the invention to a telephone circuit having direct-current supplied by central-energy means.

Referring to the drawings, and specifically to Fig. 1, A represents the transmitting station, B the receiver at the other end of the line and C the repeating or reinforcing station. At A, 1 represents the variable resistance telephonic transmitter in series with the battery 2 and the primary 3 of the local induction coil of which the secondary 4 is in series with the line 5 and the windings of the receiver B.

Serially related to the line are the instrumentalities of the repeating or reinforcing arrangement C. These comprise an auto-transformer 6 having a secondary 7 related by step-down connection to the receiving magnet 8 operating upon the variable resistance microphonic device 9, which latter is in series with the local direct-current supply 10 and the primary 11 of the step-up transformer 12; the windings of said auto-transformers being in series with the main line 5 as shown. Preferably, a condenser is interposed in the main line as 10'.

The local circuit in series through 9, 10, 11, has also in series the windings of the electro-magnet 13 and a variable resistance device 14, comprising related microphonic members 15 and 16, the latter having rigidly and centrally connected to it an armature 17 in the field of said magnet 13. A shunt circuited around the windings of said magnet is also shown with condenser 18 therein. The construction of said magnet and related microphone is shown on a larger scale in Fig. 2. The said magnet as shown in this figure is without permanent magnetism, being energized entirely by the flow of direct-current from the local battery 10. The magnet has pole pieces 19 and 19' which carry the windings 20, 21. In the field of the magnet is an armature 17, preferably laminated, connected by stem 23 to a disk 24, which has a circularly arranged carbon electrode 16 mounted thereon, with an upwardly rounded surface. This electrode 16 is held in contact with stationary electrode 15 mounted on a plate 27 which latter is rigidly held in any appropriate manner. The magnet, which is preferably arranged vertically, holds the electrodes 16 and 15, in contact, and co-acts with gravitational effect to permit vibratory movement of the vibratory electrode 16 and connected structure. The magnet windings 20, 21, are in series through the conductor 28 with the microphone electrodes 15, 16, the conductor 29, and the elements 9, 10, 11, as shown in Fig. 1. By this construction it will be seen that when any increase of conductivity in microphone 9 is caused by the magnet 8 the resulting current increase in the local direct circuit will be active to cause a corresponding increase of pressure and therefore conductivity between the electrodes 16 and 15; and similarly any decrease of current flow through 9 due to increase of resistance in 9 resulting from the action of the magnet 8 will similarly operate to decrease the current flow through the windings of the magnet 13 and therefore increase the resistance and decrease current flow similarly through the microphonic members 16 and 15. These actions of the microphone 9 and the microphonic members 16 and 15 being synchronous and similar, it will be seen that they are co-active to increase and decrease the total resistance in the local circuit through 9, 10, 11; and thus are co-active to increase the undulatory wave form of the local current through 9, 10, 11.

The microphone 9 being regarded as the primary means for setting up undulations in the direct current, it will be seen that the magnet 13 and microphone operated thereby constitute co-active auxiliary means to intensify the undulations of the local direct current flow.

It will be observed that it is essential that the action of the primary and auxiliary current-varying means must be similar. That is, any increase of current flow through one must be active to cause increase of current flow through the other, otherwise they would operate each to check the other in its effect upon the direct-current flow. This means that increase of current flow in the windings of the magnet 13 must operate through appropriate construction to increase and not decrease the conductivity between the microphonic members 16 and 15 connected to be operated by said magnet 13. To provide appropriate mechanism for this I have shown herein what I have termed a gravity-actuated telephonic repeating instrument such as specifically illustrated in another co-pending application of mine.

I may, as shown in Fig. 1, connect around the windings of the magnet a shunt circuit through the condenser 18; this shunt circuit operating largely to relieve the windings of the magnet 13 of any self-inductive choke resulting therein from variation of current flow.

Fig. 2ª is a plan view looking down on the dotted lines $a$, $a$, Fig. 2, showing the construction and arrangement of the microphone 16, 15, supporting plate 27, and the connecting stem 23.

Fig. 3 shows an arrangement which may be substituted for the construction shown in Fig. 2. Here the magnet 13 is provided with pole pieces 19, 19', carrying the coils 20, 21. In this form said magnet 13 is mounted horizontally, and the coöperative microphonic and controlling arrangement includes the vibratory circular diaphragm 34, mounted in an appropriate circular clamping device 35, and having centrally mounted thereon the armature and vibratory electrode structure. The armature 17 is connected by the stem 23 centrally to the diaphragm by means of the holding nut 38. This connecting stem has an outwardly flaring portion 39, on which is mounted a circular carbon electrode 16 formed as in Fig. 1. This vibratory electrode 16 is in contact with a flat electrode 15 mounted on a stationary suitable supporting device 27. The initial magnetism resulting from the initial energization of the magnet 13 by the local current through the windings of the coils 20, 21, puts the diaphragm 34 under initial stress toward the magnet 13 and retains the microphonic members 15, 16, in permanent contact. The local circuit is as before in series through the windings 20, 21, the conductor 28, the related electrodes of the microphone 15, 16, and on through conductor 29. It will be seen in this construction, as in that shown in Fig. 2, increase of energy in the windings in the magnet 13 tends to increase pressure and therefore conductivity between the electrodes 15, 16, of the controlled microphone.

In Fig. 4 the magnet 13 is either permanently magnetized or has a separate permanent magnetizing circuit 51 with a separate source of energy 52 in series with the separate magnetizing coils 53, 54. Here the local circuit to be controlled is in series by the conductor 55 with the coils 56, 57, located on pole pieces 58 of the magnet 13 as are the windings 53, 54. This local circuit to be controlled is then in series through the conductor 58 with the diaphragm 59 and a granular contact microphone 60 as commonly employed in telephony. In using this form of magnet and related microphone, the diaphragm 59 being under an initial stress through the initial magnetism of the magnet 50, the local circuit to be controlled is connected through the conductor 55 so that any increase of direct current flow caused in such an arrangement as shown in Fig. 1 through action on the microphone 9 tends to decrease the initial magnetism of the magnet 50 whereby stress on the diaphragm 59 is decreased and conductivity through the microphone 60 increased; as in the forms shown in Figs. 2 and 3.

The form shown in Fig. 2 shows what is obviously a preferable arrangement as the construction is simpler and induction between such windings as shown in Fig. 4 in the coils 53, 54, and coils 56 and 57 respectively eliminated. It will be clear that the magnet 50 might be initially magnetized by permanent magnetism. These two windings in Fig. 4 included respectively in the coils 53, 54, and the coils 56, 57, while shown as separate, are preferably wound on together and in parallel.

In Fig. 5 there is shown a combination involving a telephone line with a direct-current supply thereon originating at a central station. In this figure D represents diagrammatically one of the well known Hayes central-energy arrangements having a central station direct-current supply 60, and the repeating coils thereat, 61, 61', 62, 62', arranged respectively in the main line sections 63, 64; with subscriber's station instruments, the line being in series through the condenser 65, and receiver 66, with a loop or shunt from 67 to 68, having in series an inductive resistance 69, and a transmitter microphone 70.

In series with one side of the main line are two auto-transformers 68, 69, the latter having a condenser 70 interposed by proper connection exterior of the structure between the primary portion 71 and the remainder of the winding 72'.

The auto-transformer 68 has its primary portion 71 connected in series with the winding of an initially magnetized repeater-receiving magnet 77, which latter has operatively related to it an armature and the connected vibratory electrode of a microphone 72. A loop circuit from the line at 73 is in series with said microphone 72, the windings of a magnet 13 as in Fig. 1, the fixed and vibratory electrodes 15 and 16 of a microphone positioned to be controlled by said magnet 13, and the primary portion 71 of the step-up auto-transformer 69, a conductor for the direct-current being led on from the terminal 74 of said primary portion to connection with the main line at 75. A condenser 76 is interposed in the main line between the connections of said loop circuit thereto.

It will be seen that, viewing the line section 63 as a transmitting line and the line section 64 as a receiving line, alternating current impulses generated by the winding 61, 62, on the winding 61', 62', will be transmitted over the line 64 and being shut out from the transmitter 70 by the interposed inductive resistance 69 will flow through the receiver 66. Simultaneously direct-current will be distributed over the line 64 from the supply 60. The condensers 76, 70, interposed in the main line will deflect the direct-current flow through the circuit 73, 72, 13, 15, 16, 74 and 75. Energization of the microphone 72 by receiving magnet 77 will cause an undulation of direct-current flow through said microphone. The winding of the magnet 13, being in series with the conductor of this direct-current which conductor also has in series the microphonic members 15, 16, connected so that any increase of current flow through 72 gives a corresponding increase of conductivity through 15 and 16, the undulation of direct-current flow set up through 72 will be intensified by the action of the magnet 13 and related microphone 15 and 16, whereby the auto-transformer 69 will be energized to re-impress on the line 64 new alternating currents.

As the line 64 must act both as a receiving and a transmitting line, and since it has in series so far as direct-current flow thereon is concerned the microphone 70 as well as the microphones 72, and 15, 16, it will be seen that the elements active upon the microphone 72, and 15, 16 must be harmoniously connected with relation to the microphone 70. That is any action of the microphone 70 to decrease resistance therein and therefore to increase direct-current flow therethrough must be made active through appropriate connections of the repeating and reinforcing instrumentalities to cause synchronous and harmonious increase of current flow through 72 and the microphone contacts 15, 16.

It will be further seen that in such forms as shown in Fig. 5 a plurality of reinforcing arrangements such as illustrated might be operatively connected or related to the line section 64 and in such case it is similarly necessary that the microphonic members interposed in the direct-current series conductor shall all be so connected and arranged that any increase or decrease of conductivity caused in one of the variable resistance devices will be accompanied by a similar increase or decrease in all the other similar elements. This obviously is accomplished by proper circuiting and arrangement of the coöperative elements.

Additional relatively high inductive and low ohmic resistance instrumentalities may be interposed in the circuit 75, 72, 15, 16, 74, Fig. 5. This additional inductive resistance if employed may advantageously be inserted in the said direct current circuit between 74 and 75. Where the microphone, as 72, in series with the direct-current conductor is a granular contact microphone this in and of itself may serve as an inductive resistance, it having been found that such a device interposes a heavy impedance to alternating currents of relatively high frequency and small amperage, such as telephonic voice currents; this being due apparently to the cross induction between the multiple parallel currents in close proximity.

It will be obvious that the windings of the undulation intensifying means in any of the figures instead of being in conductive series may be inductively related to the energizing line. That is, referring to the magnet 13 in Figs. 1 and 5, it will be apparent that this magnet may be energized by a secondary, that is inductionally related to the direct-current flow shown in the figures as circuited through the magnet windings; but the direct-current circuit, in order to accomplish the desired results must be in series relation to the variable-resistance device controlled by the magnet.

Wherever I have diagrammatically shown auto-transformers these preferably are constructed for telephonic purposes in the manner in which induction coils for such use are generally built, that is, with a coarse wire interior portion and a fine wire exterior portion, all arranged in concentric layers and of course connected to have a similar magnetizing effect; the interior portion being connected as a primary in step-up work and as a secondary in step-down work as shown in Figs. 1 and 5. Properly constructed in this way, self-inductive effects in the transformer on the primary portion are substantially eliminated, the whole inductive effect being made active on the secondary.

In general the magnet 13 preferably has a winding relatively high in ampere turns and relatively low in ohmic resistance.

It will be seen from the foregoing that what is disclosed is means, in various combinations, whereby the undulatory wave form set up in a direct-current may be intensified by apparatus substantially wholly in series with the conductor carrying such current, arranged so that the series action of the current is made active upon another series instrumentality connected and arranged so that variations of resistance thereby caused are made harmonious and synchronous with the form of undulation originally impressed upon the current.

In the foregoing specification I have described and explained the invention primarily as an apparatus for increasing the amplitude of amperage variations of a direct current flowing in a conductor. It will be obvious that broadly the invention provides means for increasing the amplitude of variations in amperage of a current flowing on a conductor as well in other instances than that of direct current. That is, the amperage variations to be increased in amplitude might be those of a high frequency alternating current in which the amperage variations (as distinguished from the alternations) are utilized in the same manner as described with reference to variations in amplitude of a direct current. The claims therefore have been drawn in a manner to cover this last mentioned use of the apparatus.

For the specific forms of circuit arrangements and apparatus chosen herein to illustrate the invention it will be obvious that without departing from the spirit thereof other well known equivalent forms and apparatus may be substituted to perform the same functions as above described; and without limiting myself to such precise embodiments—

What I claim as my invention is:—

1. Means for increasing the amplitude of variation of a varying current on a conductor, embodying, in combination with said conductor, a device energized by such conductor and current-varying means controlled by said device and in series with said conductor, the latter being in series through the windings of said device and through said means.

2. Means for increasing the amplitude of variation of a varying current on a conductor, embodying, in combination with said conductor, an electro-magnetic device having its winding in series with said conductor and resistance-varying means controlled by said device and in series with said conductor, the latter being in series through the windings of said device and through said means.

3. Means for intensifying the undulations of a varying direct-current, comprising, in combination with a direct-current-energized conductor and means to give the current thereon an undulatory form, an electro-magnetic device operatively related to said conductor and an instrumentality operated by said device and having means in series with said conductor adapted to control current flow therethrough responsively to the varying energization of said electro-magnetic device, said conductor being in series through the windings of said device and through said means.

4. Means for intensifying the undulations of a varying direct-current, comprising, in combination with a direct-current-energized conductor and means to give the current thereon an undulatory form, an electro-magnetic device having its windings in series with said conductor and an instrumentality operated by said device and having means in series with said conductor adapted to control current flow therethrough responsively to the varying energization of said electro-magnetic device, said conductor being in series through said windings and said means.

5. Means for intensifying the undulations of a varying direct-current, comprising, in combination with a direct-current-energized conductor and means to give the current thereon an undulatory form, an electro-magnetic device having its windings in series with said conductor and a variable-resistance instrumentality controlled by said device and in series with said conductor, the latter being in series through said windings and said instrumentality.

6. Means for intensifying the undulations of a varying direct-current, comprising, in combination with a direct-current-energized conductor and means to give the current thereon an undulatory form, an electro-magnet having its windings in series with said conductor, a microphone having a fixed electrode and a vibratory electrode, an armature free to vibrate in the field of said magnet and operatively connected to said vibratory electrode, said vibratory electrode and connected armature being positioned and supported to vibrate responsively to the varying energization of said magnet, and series connection for said conductor through said microphone, said windings and said microphone being in series with each other as related to said conductor.

7. Resistance-varying means for a direct-current conductor comprising an electromagnetic device, variable-resistance means operatively controlled by said device, and series connections for said conductor through the windings of said device and through said means.

8. Resistance-varying means for a direct-current conductor comprising an electro-magnet, an armature free to vibrate in the field of said magnet, a microphone controlled by said armature, and series connections of said conductor through the windings of said electro-magnet and through said microphone.

9. Resistance-varying means for a direct-current conductor comprising a substantially vertically-positioned electro-magnet, a horizontally-positioned armature disposed below the poles of said magnet, a microphone having a fixed electrode and a vibratory electrode, the latter attached to said armature; the microphonic members and armature being positioned so that the normal action of the magnet maintains the microphonic members in unbroken contact; and series connections for said conductor through the windings of said magnet and through said microphone.

10. In a central-energy telephone system, in combination with a main line section connected to conduct both alternating voice-currents and a direct-current generated at the central station; means to deflect said direct-current in a loop circuit from the line, alternating current reinforcing instrumentalities comprising a receiving element energized by said line and transmitting devices having said loop circuit in series, controlled by said receiving element and operative to set up new alternating currents in said line, and means to intensify the undulations of said direct-current set up by said receiving element comprising an electro-magnet having its windings in series with said loop circuit and a variable-resistance instrumentality controlled by said magnet and in series with said loop circuit.

Signed at said Boston this 25th day of May, 1912.

CHARLES D. LANNING.

Witnesses:
JAMES D. GORDON,
E. LILLIAN McFADDEN.